United States Patent [19]
Shimotoyodome et al.

[11] Patent Number: 5,638,876
[45] Date of Patent: Jun. 17, 1997

[54] LIQUID CRYSTAL INTRODUCTION CONNECTOR

[75] Inventors: Gyo Shimotoyodome; Isao Sugiura, both of Tokyo, Japan

[73] Assignee: Beldex Corporation, Tokyo, Japan

[21] Appl. No.: 596,959

[22] Filed: Feb. 5, 1996

[51] Int. Cl.$^6$ ..................................................... B65B 3/00
[52] U.S. Cl. ........................ 141/386; 141/383; 141/370; 141/7; 141/65
[58] Field of Search ................................. 141/1, 4, 5, 7, 141/59, 65, 369, 370, 383, 385, 386

[56] References Cited

U.S. PATENT DOCUMENTS

| | | | |
|---|---|---|---|
| 3,698,449 | 10/1972 | Sorkin et al. | 141/1 |
| 3,701,368 | 10/1972 | Stern | 141/1 |
| 3,960,534 | 6/1976 | Oates | 141/1 X |
| 4,753,276 | 6/1988 | Inaba et al. | 141/7 |
| 5,246,042 | 9/1993 | Farrell | 141/59 |
| 5,399,114 | 3/1995 | Park | 141/7 X |
| 5,406,989 | 4/1995 | Abe | 141/7 |
| 5,477,349 | 12/1995 | Fujiwara | 141/7 X |
| 5,568,297 | 10/1996 | Tsubota et al. | 141/5 X |

FOREIGN PATENT DOCUMENTS

| | | |
|---|---|---|
| 62-141516 | 6/1987 | Japan . |
| 64-37529 | 2/1989 | Japan . |

*Primary Examiner*—J. Casimer Jacyna
*Attorney, Agent, or Firm*—Fish & Richardson, P.C.

[57] ABSTRACT

A liquid crystal introduction connector includes a connector body. The connector body has a guide groove formed in its front surface and a receiving space formed backwardly of the guide groove. A resilient seal member is received in the receiving space. A nozzle member is allowed to extend through the seal member such that the nozzle member can move forwardly and backwardly. The nozzle member is biased forwardly by a spring. When a side edge of a cell having an introduction port is inserted through the guide groove, the seal member is resiliently deformed to receive the side edge. Under the effect of the spring, the nozzle member is brought into abutment with the side edge of the cell. The liquid crystal passes through a liquid crystal supply passageway and reaches the introduction port of the cell via nozzle ports of the nozzle member.

10 Claims, 5 Drawing Sheets

1

LIQUID CRYSTAL INTRODUCTION CONNECTOR

BACKGROUND OF THE INVENTION

This invention relates to a connector for introducing a liquid crystal smoothly into a cell.

In order to introduce a liquid crystal into a cell, the cell is provided with a suction port and an introduction port. An internal space of the cell is evacuated by vacuum through the suction port, and in that state, the liquid crystal is introduced into the internal space of the cell through the introduction port. As one method for introducing the liquid crystal, there is a method, as disclosed in Japanese Laid-Open Patent Application No. 141516/87 in which a liquid crystal is introduced into the internal space of the cell with a portion around the introduction port dipped into the liquid crystal. This method, however, has such inconveniences that since the liquid crystal tends to adhere to a wide range of area around the introduction port of the cell, the liquid crystal is wastefully consumed and the work for wiping off the liquid crystal requires much time and labor.

In another method as disclosed in Japanese Laid-Open Patent Application No. 37529/89, a connector is attached to an introduction port and a liquid crystal is introduced into a cell either under a normal pressure or under an increased pressure in accordance with necessity. This method, indeed, makes it possible to avoid adhesion of the liquid crystal over a wide range of area. However, this publication fails to disclose a detailed construction of the connector.

SUMMARY OF THE INVENTION

It is, therefore, an object of the present invention to provide a liquid crystal introduction connector, in which leak of the liquid crystal can positively be prevented.

According to the present invention, there is provided a liquid crystal introduction connector, which connector is utilized when a liquid crystal is introduced into a cell through an introduction port formed at one side edge of the cell, the liquid crystal introduction connector comprising:

(a) a connector body including a guide groove formed in a front surface thereof and adapted to guide the one side edge of the cell, a receiving space formed backwardly of the guide groove and communicated with the guide groove, and a liquid crystal supply passageway communicated with the receiving space;

(b) a resilient seal member received in the receiving space of the connector body and adapted to receive the one side edge of the cell guided by the guide groove while being resiliently deformed;

(c) a nozzle member extending through the seal member such that the nozzle member can move forwardly and backwardly, the nozzle member having a nozzle port extending in a direction of movement of the nozzle member, an opening at a front end of the nozzle hole being in communication with the introduction port of the cell with the one side edge of the cell abutted against the nozzle member, an opening at a rear end of the nozzle port being in communication with the liquid crystal supply passageway of the connector body; and (d) bias means for biasing the nozzle member toward the cell.

DETAILED DESCRIPTION OF THE EMBODIMENTS

Figure 1:
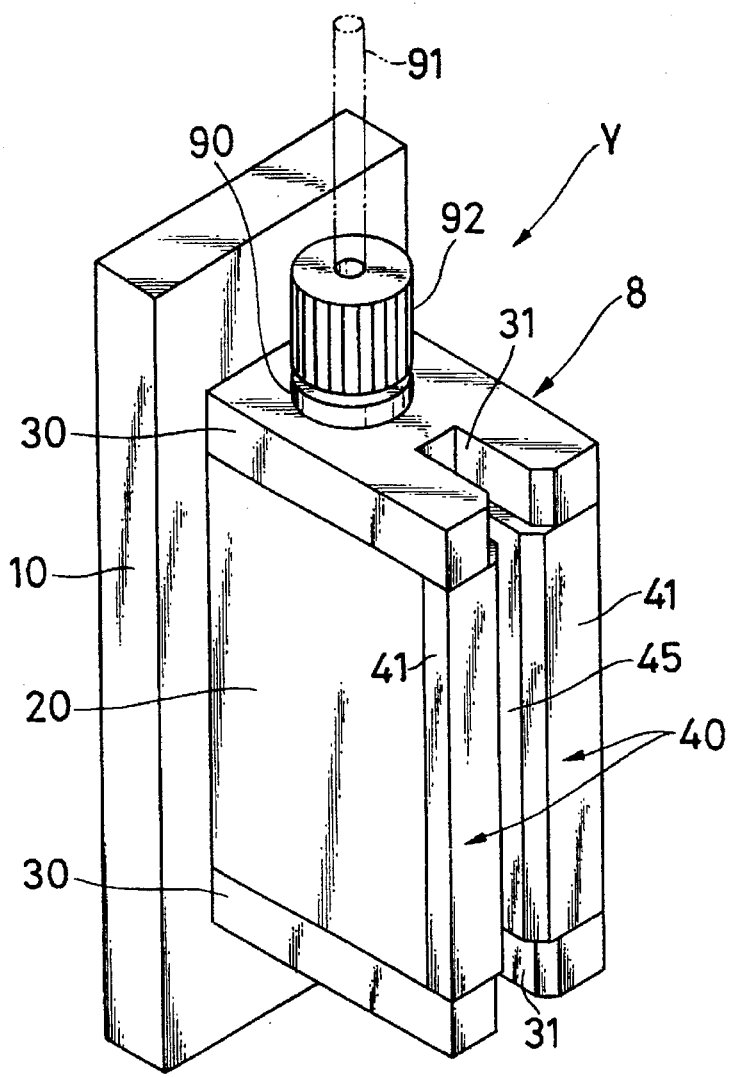
FIG. 1 is a perspective view showing a liquid crystal introduction connector according to one embodiment of the present invention.
Figure 2:
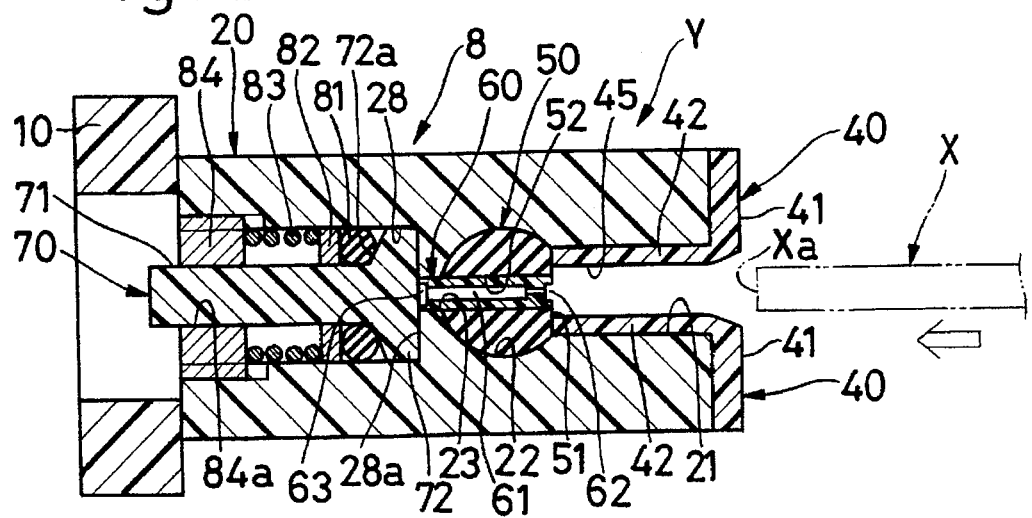
FIG. 2 is a cross sectional view of the connector for a liquid crystal.
Figure 3:
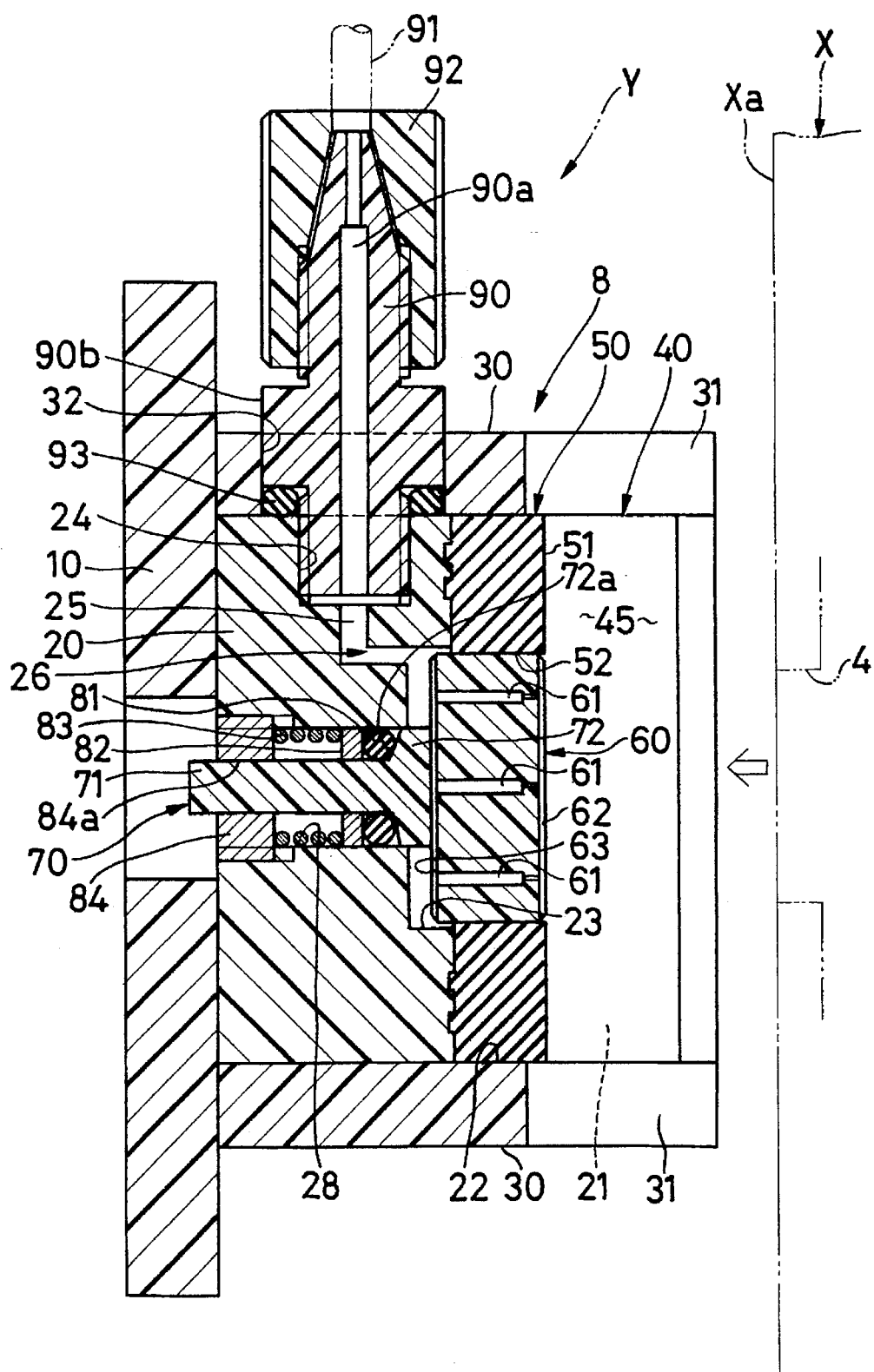
FIG. 3 is a vertical sectional view of the connector for a liquid crystal.
Figure 5:
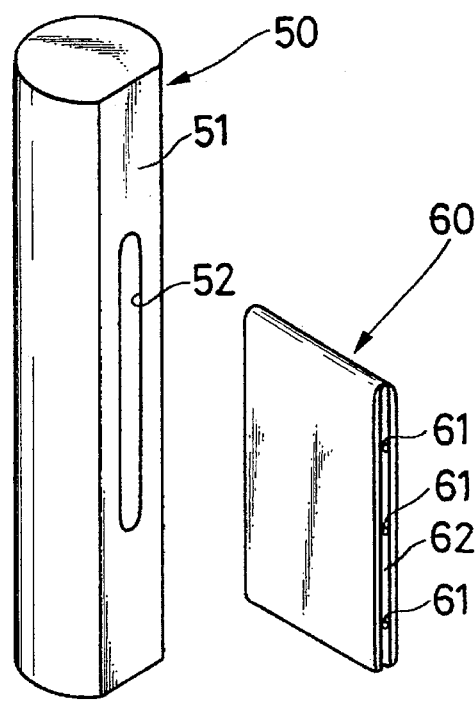
FIG. 5 is a perspective view of a seal member and a nozzle member of the liquid crystal introduction connector.
Figure 6A:
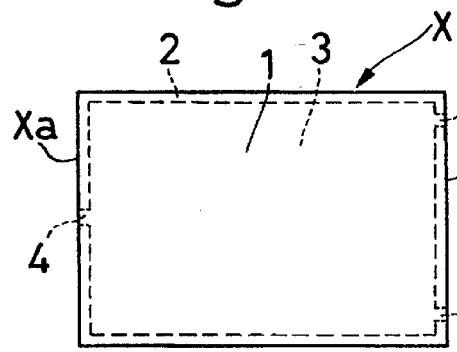
FIG. 6A is a side view of the cell.

Before proceeding to the detailed description of a liquid crystal introduction connector Y according to one embodiment of the present invention, a cell X will be described first. As shown in FIG. 6A, the cell X is composed of a pair of rectangular glass sheets 1 whose peripheral edge portions are attached to each other by an adhesive layer 2. An internal space 3 having a micro width (about 5 μm) is defined by the pair of glass sheets 1 and the adhesive layer 2. The adhesive layer 2 is physically discontinued at a central part of one side edge Xa of the cell X and this part of the side edge Xa serves as an introduction port 4. The adhesive layer 2 is also physically discontinued but at two parts of the other side edge Xb of the cell X, and those two parts serve as suction ports 5, respectively. The liquid crystal introduction connector Y will now be described with reference to FIGS. 1 through 5. As shown in FIGS. 1 through 3, the connector Y includes a connector body 8. This connector body 8 includes a vertically elongated plate-like base 10, a vertically elongated rectangular parallelepiped block member 20 firmly secured to a front surface of the base 10 by screw means (not shown), a pair of end plates 30 firmly secured to upper and lower surfaces of the block member 20 by screw means (not shown), respectively, and a pair of guide members 40 firmly secured to a front portion of the block member 20 by screw means (not shown), respectively.

Figure 4A:
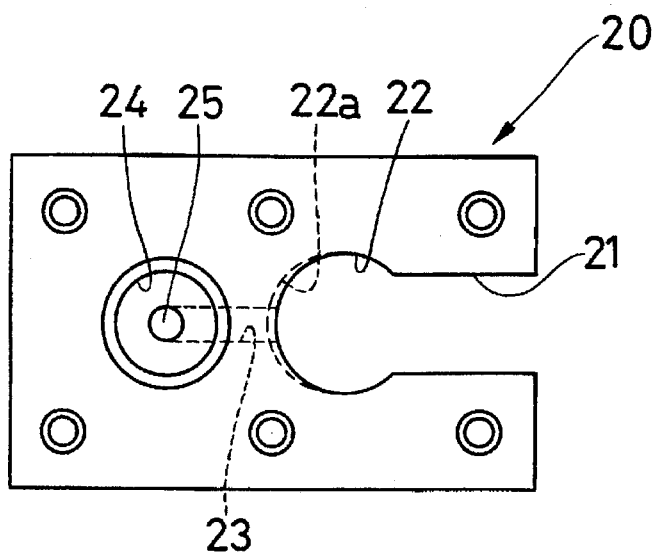
FIG. 4A is a plan view of a block member which constitutes a main portion of a connector body of the liquid crystal introduction connector.
Figure 4B:
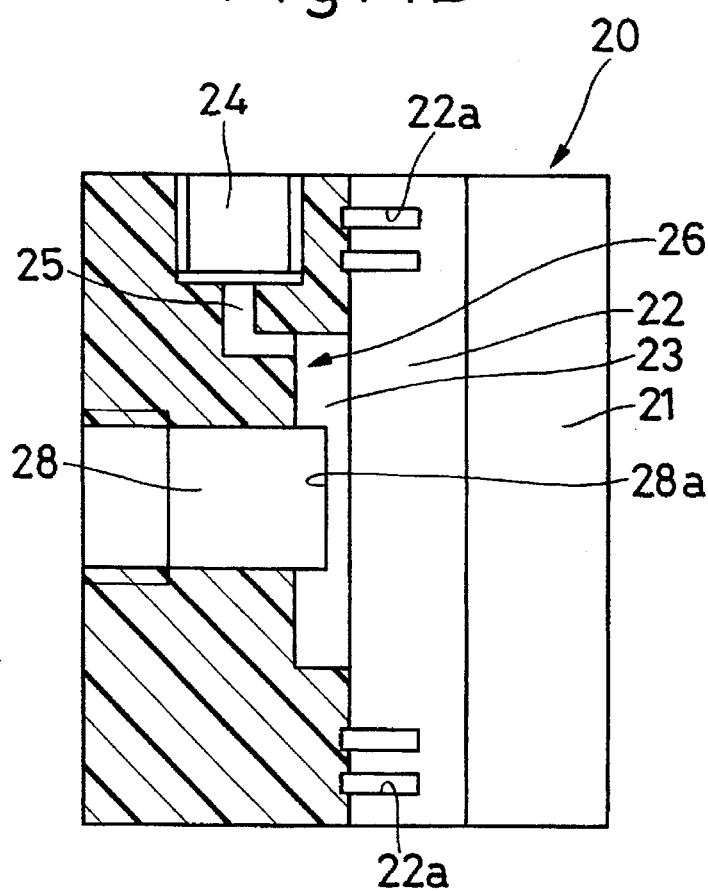
FIG. 4B is a vertical sectional view of the block member.
Figure 4C:
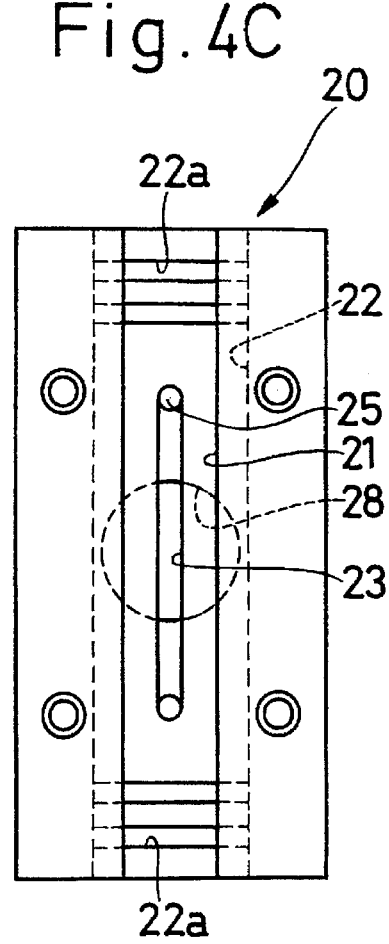
FIG. 4C is a front view of the block member.

A construction of the block member 20 will be described first. As best shown in FIGS. 4A to 4C, a groove 21 extending upwardly and downwardly is formed in a front surface of the block member 20. A receiving hole 22 (receiving space), having a circular shape in section and extending upwardly and downwardly, is formed at an inner (rear) part of the groove 21. The receiving hole 22 is adapted to receive a seal member 50 as later described. The hole 22 has a diameter larger than the width of the groove 21, and is in communication with the groove 21. The groove 21 and receiving hole 22 are opened at an upper and a lower surface of the block member 20, respectively. Arcuate engagement grooves 22a are formed at an upper and a lower part of the receiving hole 22, respectively.

The block member 20 further has a slide hole 23 formed therein. This slide hole 23 is located backwardly of the receiving hole 22. The slide hole 23 is adapted to receive a rear part of a nozzle member 60, as later described, such that the nozzle member 60 can slide forwardly and backwardly. The slide hole 23 is narrow in width but long in a vertical direction. The slide hole 23 is in communication with the receiving hole 22.

A mounting hole 23, which is comprised of a threaded hole, is formed in a rear part of an upper surface of the block member 20. The mounting hole 24 leads to an upper end of the slide hole 23 through an L-shaped passageway 25. The slide hole 23 coacts with the passageway 25 to define a liquid crystal supply passageway 26.

The block member 20 has a support hole 28 formed in a rear surface of the block member 20 and extending forwardly. The support hole 28 is circular in section. This support hole 28 is adapted to support a coil spring 83, etc., as later described, received therein. As best shown in FIG. 4B, a front end 28a of the support hole 28 is located in the center in a forward and backward direction of the slide hole 23. Owing to this arrangement, the support hole 28 leads to the receiving hole 22 through the slide hole 23.

As best shown in FIG. 2, each guide 40 has an L-shape in section, consisting of an element 41 and an element 42. The element 41 is firmly secured to the front surface of the block member 20, whereas the other element 42 is disposed along an inner surface of the groove 21 of the block member 20. A gap between the elements 42 is provided as a main portion of a guide groove 45. A width of the main portion of the guide groove 45 is substantially equal to a thickness of the cell X. More strictly, it is wider than the thickness of the cell X by a small clearance portion.

The upper and lower end plates 30 are provided with slits 31, respectively. The slits 31 extend backwardly from the center of a front edge of each end plate 30. The widths of the upper and lower slits 31 constitute upper and lower end portions of the guide groove 45, respectively. They are wider than the width of the main portion. Rear ends of the slits 31 have a role for positioning the cell X, as later described.

As shown in FIGS. 2 and 3, the resilient seal member 50 is received in the receiving hole 22 of the block member 20. As best shown in FIG. 5, the seal member 50 is of a generally circular column-like configuration. The seal member 50 includes a flat receiving surface 51 at its front side which is faced with the guide groove 45. The seal member 50 has a through-hole 52 extending in a direction perpendicular to its longitudinal direction, i.e., in a forward and backward direction of the connector body 8. The through-hole 52 is narrow in width but long in vertical length. A front end of the through-hole 52 is opened at a central portion of the receiving surface 51. A diameter of the seal member 50 is slightly larger than that of the receiving hole 22. For this reason, the seal member 50 is received in the receiving hole 22 in the state that the seal member 50 is slightly compressed in a radial direction thereof. A part of the seal member 50 corresponding to the engagement groove 22a is inserted in the engagement groove 22a. Because of this feature, the seal member 50 is received in a stable manner. An upper and lower end of the seal member 50 are pressed by the pair of end plates 30, respectively. As shown in FIG. 3, in the received state of the seal member 50, the receiving surface 51 is located forwardly of the rear ends of the slits 31 of the end plates 30.

The nozzle member 60 is press fitted in the through-hole 52 of the seal member 50. As best shown in FIG. 5, the nozzle member 60 is formed of a rectangular plate. The nozzle member 60 is provided with a plurality (three, for example) of nozzle ports 61 extending in a forward and backward direction and spacedly arranged in an upper and lower direction. The nozzle member 60 is slightly larger in its width and in its vertical length than the through-hole 52 of the seal member 50. The nozzle member 60 is press fitted in the through-hole 52 such that the nozzle member 60 can move forwardly and backwardly. As apparent from FIGS. 2 and 3, the nozzle member 60 is dimensioned such that the length of the nozzle member 60 in the forward and backward direction is larger than that of the seal member 50. In the state that the nozzle member 60 is inserted in the seal member 50, a front edge of the nozzle member 60 is generally equally located as the receiving surface 51 of the seal member 50 and a rear part thereof is allowed to project from the seal member 50 so that it can be slidably received in the slide hole 23 of the block member 50.

As best shown in FIG. 3, the nozzle member 60 is provided at front and rear edges thereof respectively with communication grooves 62 and 63 extending in a vertical direction. The openings at the front ends of the nozzle ports 61 are communicated with each other through the communication groove 62, whereas the openings at the rear ends of the nozzle ports 61 are communicated with each other through the communication groove 63.

A pressing member 70 is received in the support hole 28 of the block member 20 such that the pressing member 70 can move forwardly and backwardly. The pressing member 70 includes a stem 71 extending coaxial with the support hole 28, and a head 72 provided on a front end of the stem 71. The head 72 is larger in diameter than the stem 71. The head 72 is generally the same in diameter as the support hole 28 so that the head 72 can slide with respect to an inner peripheral surface of the support hole 28. A rear surface of the head 72 is a tapered surface 72a which is gradually diverged forwardly.

There are an O-ring 81, a spring retainer 82, a compressed coil spring 83 (bias means) and a support 84, which are all received in the support hole 28 of the block member 20 in this order backwardly from the head 72 of the pressing member 70. The support 84 is screwed into a rear part of the support hole 28. The stem 71 of the pressing member 70 is allowed to extend through the O-ring 81 and spring retainer 82, and then through a slide hole 84a formed in the support 84 such that the stem 71 can slide. The O-ring 81 is arranged in an annular gap between an outer peripheral surface of the stem 71 and the inner peripheral surface of the support hole 28. The coil spring 83 is adapted to bias the pressing member 70 forwardly through the spring retainer 82 and O-ring 81. A forward movement of the pressing member 70 is restricted because the head 72 is brought into abutment with a front end 28a (see FIG. 2 and FIG. 4B) of the support hole 28. When the pressing member 70 is in its foremost position, the nozzle member 60, which is in abutment with a front end of the pressing member 70, is generally equally located at its front edge as the receiving surface 51 of the seal member 50.

A lower end portion of a joint 90 is threadedly engaged in the mounting hole 24 of the block member 20. An upper part of the joint 90 is tapered. One end portion a liquid crystal supply tube 91 is enlarged in diameter and attached to the tapered upper end portion of the joint 90, and it is firmly secured by a nut 92 threadedly engaged with the joint 90. A communication passageway 90a is formed in the joint 90. The liquid crystal supply tube 91 is communicated with the liquid crystal supply passageway 26 of the block member 20 through the communication passageway 90a. An enlarged diameter portion 90b is formed at an intermediate portion of the joint 90. This enlarged diameter portion 90b is received in a hole 32 formed in the upper end plate 30. An O-ring 93 is interposed between the increased diameter portion 90b and the block member 90.

Material of the liquid crystal introduction connector Y thus constructed will now be described. The spring retainer 82, coil spring 83 and support 84 are made of metal, for example, stainless, and the remaining components are made of non-metal. Specifically, the block member 20, end plates 30, nozzle member 60, pressing member 70, joint 90 and nut 92 are formed of a fluororesin which is chemically most stable with respect to the liquid crystal. The seal member 50, O-ring 81 and O-ring 93 are formed of a fluororubber. The base 10 and guides 40, which are required to have a comparatively large mechanical strength, are formed of a hard resin. The tube 91 is also formed of a fluororesin.

Figure 6B:
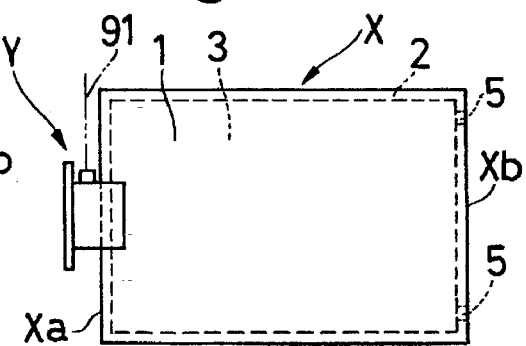
FIG. 6B is a side view of the cell with the liquid crystal introduction connector attached thereto.

Next, the steps of introducing a liquid crystal into the internal space 3 of the cell X utilizing the liquid crystal introduction connector Y thus constructed will be described. First, as shown in FIG. 6B, the connector Y is attached to a central portion of the side edge Xa of the cell X. More specifically, in the state that the connector Y is held in a predetermined position, the cell X is moved in a direction as indicated by an arrow of FIGS. 2 and 3 utilizing an air cylinder (not shown), so that the side edge Xa is inserted into the guide groove 45 of the connector Y. When the cell X is further pushed in the same direction after the side edge Xa has brought into abutment with the receiving surface 51 of the seal member 50, the seal member 50 is resiliently deformed and the nozzle member 60 is retreated against the coil spring 83. The movement of the cell X is finished at the time of the side edge Xa abutting against the rear ends of the slits 31 of the end plates 30. Thereafter, the air cylinder keeps pushing the cell X until after the completion of the filling work of liquid crystal into the cell X. It is acceptable that the cell X is held in the predetermined position and the connector Y is pushed toward the cell X.

As mentioned above, since the seal member 50 is brought into abutment with the side edge Xa of the cell X while being resiliently deformed, a very tight sealing between the peripheral edge portion of the introduction port 4 and the seal member 50 can assuredly be obtained, thus enabling to prevent leak of the liquid crystal through therebetween. Since a pushing amount of the cell X is determined by the rear ends of the slits 31, an amount of resilient deformation of the seal member 50 can be controlled to the level which is not too large nor too small. As a consequence, the seal member 50 can be prevented from being deteriorated in a short time and the liquid crystal can be prevented from leaking.

In the state that the connector Y is attached to the cell X, the nozzle ports 61 are faced with the introduction port 4 of the cell X. Since the nozzle member 60 is brought into abutment with the side edge Xa under the effect of the coil spring 83, the nozzle ports 61 are assuredly communicated with the introduction port 4 of the cell X.

Subsequently, a vacuum evacuation device is connected to the suction ports 5 through a connector not shown, so that the internal space 3 of the cell X is evacuated by the evacuation device through the suction ports 5. When the internal space 3 is evacuated to a predetermined level, a valve (not shown) provided on the liquid crystal supply tube 91 is opened. By doing this, a liquid crystal, which has been pressurized to a level of several times a normal atmospheric pressure, is delivered from a liquid crystal supply source (not shown) to the connector Y via the liquid crystal supply tube 91.

The delivered liquid crystal is introduced into the introduction port 4 of the cell X via the communication passageway 90a of the joint 90, the liquid crystal supply passageway 26 of the block member 20 and the nozzle ports 61 of the nozzle member 60, and filled in the internal space 3. At that time, since the nozzle ports 61 are intercommunicated through the communication grooves 62 and 63, the liquid crystal is introduced into the introduction port 4 from the nozzle ports 61 under a generally equal pressure. Thus, the introduction can be made more reliably.

In the liquid crystal introduction steps, since the liquid crystal does not pass through the support hole 28 in which the coil spring 83, etc., are received, the liquid crystal can be supplied smoothly and stably. Moreover, since the metal coil spring 83 does not contact the liquid crystal, a lowering of electric resistance of the liquid crystal caused by melting of metal iron into the liquid crystal can be prevented.

Communication between the liquid crystal and the metal component members such as the coil spring 83, etc., can be cut off more reliably by the O-ring 81. Since the O-ring 81 contacts the tapered surface 72a of the head 72 of the pressing member 70, it tends to expand in a radial direction when it is subjected to the force of the coil spring 83 through the spring retainer 82. As a consequence, the O-ring 81 is caused to firmly contact the tapered surface 72a of the head 72 and the inner peripheral surface of the support hole 28, thus further enhancing the effect of seal.

When the cell X is brought away from the connector Y after the liquid crystal has been filled in the internal space 3, the seal member 50 is restored to its original state and the nozzle member 60 is returned to its original position by the coil spring 83.

Next, further embodiments of the present invention will be described. In the embodiments, component parts corresponding to those of the first embodiment are denoted by identical reference numerals respectively and detailed description thereof is omitted. In the description of the embodiments to follow, description is made only on a construction of a different component part from the first embodiment. The construction of the remaining component part is the same as the first embodiment.

Figure 7:
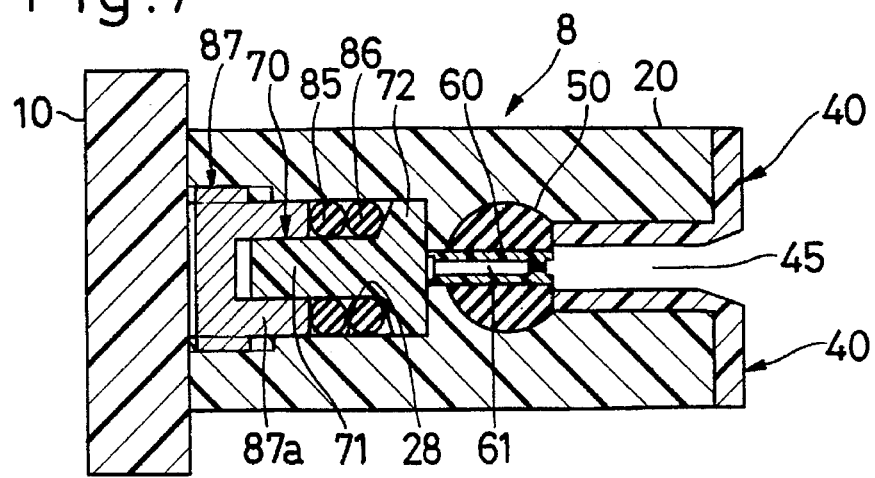
FIG. 7 is a cross sectional view of a liquid crystal introduction connector according to a second embodiment of the present invention.

FIG. 7 shows a second embodiment of the present invention. Two O-rings 85 and 86 are received in a support hole 28 of a connector body 8. Those O-rings 85 and 86 serve as bias means and as seal means. A support 87 threadedly engaged in the support hole 28 includes a sleeve portion 87a. A rear end portion of a stem 71 of a pressing member 70 is slidably received in the sleeve portion 87a. The sleeve portion 87a of the support 87 pushes the O-rings 85 and 86. As a consequence the O-rings 85 and 86 are resiliently deformed to produce a force for urging a head 72 of the pressing member 70 forwardly.

Figure 8:
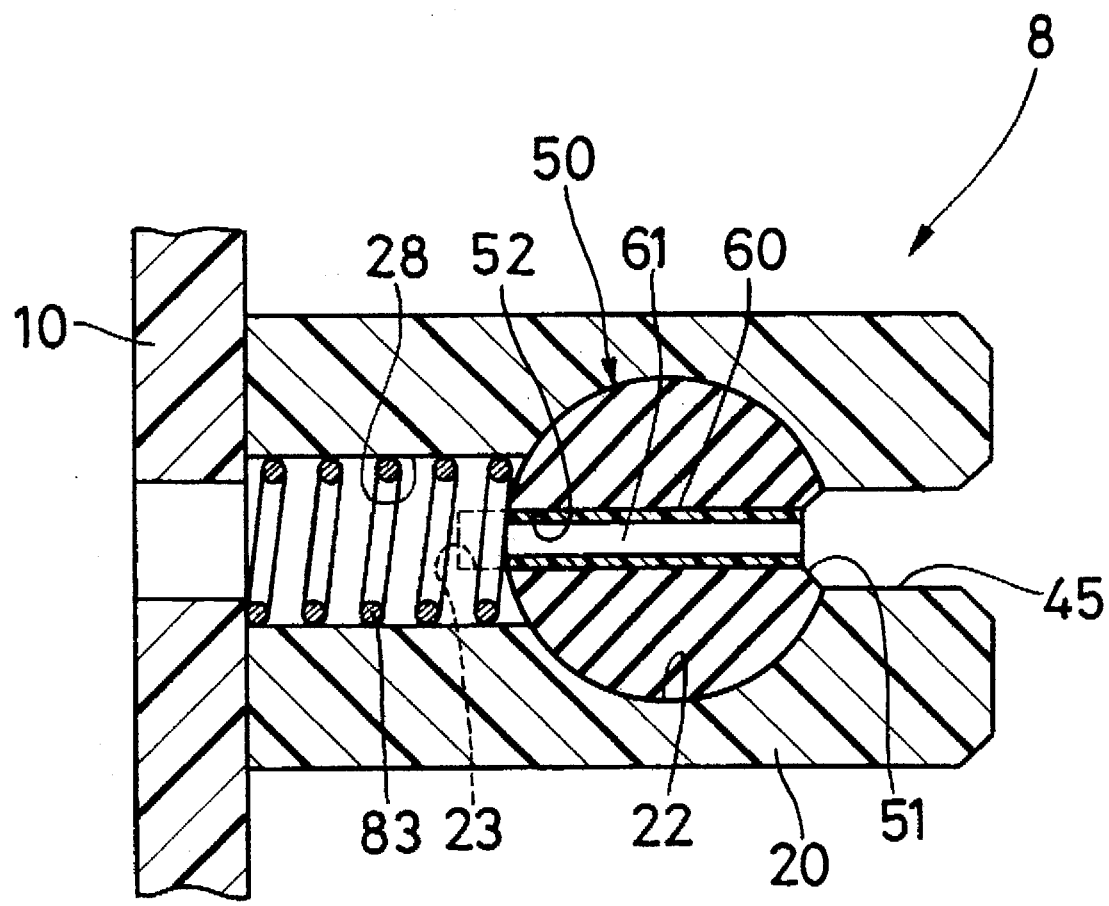
FIG. 8 is a cross sectional view showing a liquid crystal introduction connector according to a third embodiment of the present invention.

FIG. 8 shows a third embodiment of the present invention. A support hole 28 of a connector body 8 serves also as a liquid crystal supply passageway. A coil spring 83 is received in the support hole 28. Since a front end of the coil spring 83 is in contact with the nozzle member 60, the nozzle member 60 is directly biased forwardly. The nozzle member 60 is constituted by flattening a tube. This nozzle member 60 has a single flat nozzle port 61. A liquid crystal is introduced into an introduction port of a cell from a joint (not shown) provided on a base 10 through the support hole 28 and then via the nozzle port 61 of the nozzle member 60.

What is claimed is:

1. A liquid crystal introduction connector, which connector is utilized when a liquid crystal is introduced into a cell through an introduction port formed at one side edge of said cell, said liquid crystal introduction connector comprising:

(a) a connector body including a guide groove formed in a front surface thereof and adapted to guide the one side edge of said cell, a receiving space formed backwardly of said guide groove and communicated with said guide groove, and a liquid crystal supply passageway communicated with said receiving space;

(b) a resilient seal member received in said receiving space of said connector body and adapted to receive the one side edge of said cell guided by said guide groove while being resiliently deformed;

(c) a nozzle member extending through said seal member such that said nozzle member can move forwardly and backwardly, said nozzle member having a nozzle port extending in a direction of movement of said nozzle member, an opening at a front end of said nozzle hole being in communication with said introduction port of said cell with the one side edge of said cell abutted against said nozzle member, an opening at a rear end of said nozzle port being in communication with said liquid crystal supply passageway of said connector body; and (d) bias means for biasing said nozzle member toward said cell.

2. A liquid crystal introduction connector according to claim 1, in which said connector body further includes a support hole disposed backwardly of said receiving space, said support hole being in communication with said receiving space and extending backwardly, said liquid crystal supply passageway being formed separately from said support hole, a pressing member being received in said support hole such that said pressing member can slide in the same direction as the moving direction of said nozzle member, a front end of said pressing member being in abutment with said nozzle member, said bias means being located backwardly of said pressing member so that said bias means can bias said pressing member forwardly and so that it also can bias said nozzle member toward said cell through said pressing member.

3. A liquid crystal introduction connector according to claim 2, in which said seal member, nozzle member, pressing member, and at least a part of said connector body in which said liquid crystal supply passageway is formed, are all composed of a non-metallic material.

4. A liquid crystal introduction connector according to claim 3, in which said pressing member includes a head slidably received in said support hole, and a stem extending backwardly from said head in such a manner as to be coaxial with said support hole, a front end of said head being in abutment with said nozzle member, an O-ring for seal being interposed between an outer peripheral surface of said stem and an inner peripheral surface of said support hole.

5. A liquid crystal introduction connector according to claim 4, in which a support is screwed into a rear part of said support hole, a plurality of said O-rings for seal being interposed between said support and said head of said pressing member, said O-rings serving also as said bias means.

6. A liquid crystal introduction connector according to claim 4, in which a coil spring serving as bias means is received in a rear part of said support hole, said coil spring being adapted to bias said pressing member forwardly through said O-ring.

7. A liquid crystal introduction connector according to claim 6, in which a rear surface of said head of said pressing member is tapered such that the rear surface is diverged forwardly, said O-ring being in contact with the rear surface of said head.

8. A liquid crystal introduction connector according to claim 1, in which said nozzle member is planar and disposed in the same plane as said cell which is inserted in said guide groove, said nozzle member being provided with a plurality of nozzle ports spacedly formed in a longitudinal direction of the one side edge of said cell, a communication groove being formed in a front edge of said nozzle member and adapted to intercommunicate openings at front ends of said nozzle ports, another communication groove being formed in a rear edge of said nozzle member and adapted to intercommunicate openings at rear ends of said nozzle ports.

9. A liquid crystal introduction connector according to claim 1, in which said connector body further includes a support hole disposed backwardly of said receiving space, said support hole being in communication with said receiving space and extending backwardly, a coil spring serving as bias means being received in said support hole, a front end of said coil spring being abutted against said nozzle member so that said nozzle member is biased toward said cell, said support hole serving also as said liquid crystal supply passageway.

10. A liquid crystal introduction connector according to claim 1, in which said connector body includes a generally rectangular parallelepiped non-metallic block member and end plates firmly secured to opposite ends of said block member, respectively, said end plates having slits serving as opposite end portions of said guide groove, rear ends of said slits being brought into engagement with the one side edge of said cell so that said cell is correctly positioned, the rear ends of said slits being located backwardly of a front surface of said seal member in which said cell is received.

* * * * *